(12) United States Patent
Kaiser et al.

(10) Patent No.: US 10,559,222 B2
(45) Date of Patent: Feb. 11, 2020

(54) SYSTEM, METHOD, AND APPARATUS FOR TRACKING TURNING INFORMATION

(71) Applicant: GOPI Corporation, Dallas, TX (US)

(72) Inventors: Justin Andrew Kaiser, San Diego, CA (US); Robert Cresswell Kaiser, Dallas, TX (US)

(73) Assignee: GOPI Corporation, Dallas, TX (US)

( * ) Notice: Subject to any disclaimer, the term of this patent is extended or adjusted under 35 U.S.C. 154(b) by 650 days.

(21) Appl. No.: 15/147,865

(22) Filed: May 5, 2016

(65) Prior Publication Data

US 2016/0351071 A1 Dec. 1, 2016

Related U.S. Application Data

(60) Provisional application No. 62/158,988, filed on May 8, 2015.

(51) Int. Cl.
| | | |
|---|---|---|
| *G09B 19/00* | (2006.01) | |
| *G01C 19/5776* | (2012.01) | |
| *G09B 5/12* | (2006.01) | |

(52) U.S. Cl.
CPC ..... *G09B 19/0015* (2013.01); *G01C 19/5776* (2013.01); *G09B 5/125* (2013.01)

(58) Field of Classification Search
CPC . G09B 19/0015; G09B 5/125; G01C 19/5776
USPC ...................................................... 434/250
See application file for complete search history.

(56) References Cited

U.S. PATENT DOCUMENTS

| | | | | |
|---|---|---|---|---|
| 5,496,248 A | * | 3/1996 | Batscher | A63B 21/0004 482/146 |
| 5,613,690 A | * | 3/1997 | McShane | A63B 22/18 273/449 |
| 6,543,769 B1 | * | 4/2003 | Podoloff | A63B 21/0004 273/148 B |
| 7,739,076 B1 | * | 6/2010 | Vock | A63B 24/0062 702/182 |
| 8,910,958 B2 | * | 12/2014 | Smith | A63C 17/014 280/14.22 |
| 9,526,970 B1 | * | 12/2016 | Failing | G06F 17/50 |
| 2007/0155495 A1 | * | 7/2007 | Goo | A63B 24/0003 463/36 |
| 2009/0105057 A1 | * | 4/2009 | Carlson | A63B 69/0066 482/146 |
| 2010/0216551 A1 | * | 8/2010 | Dwyer | A63F 13/06 463/36 |
| 2011/0034301 A1 | * | 2/2011 | Barre | A63B 24/00 482/4 |
| 2011/0060550 A1 | * | 3/2011 | Vock | G01P 3/50 702/141 |
| 2012/0116714 A1 | * | 5/2012 | Rogel | H04R 1/02 702/150 |
| 2012/0289378 A1 | * | 11/2012 | Sperry | A63B 22/16 482/8 |
| 2015/0202495 A1 | * | 7/2015 | Klein | A63B 22/0015 482/146 |

(Continued)

*Primary Examiner* — Robert P Bullington
(74) *Attorney, Agent, or Firm* — Thomas C. Cecil

(57) ABSTRACT

A rigid elongated member with at least a longitudinal curvature and a cushion placed on the concave side of the member. An electronics module is disposed between the cushion and the rigid member and records information about rotation of the member. Data is captured, processed, and may be displayed on a computing device.

20 Claims, 4 Drawing Sheets

(56) References Cited

U.S. PATENT DOCUMENTS

2015/0351573 A1\* 12/2015 Heath ................... A63B 22/16
428/78

\* cited by examiner

SYSTEM, METHOD, AND APPARATUS FOR TRACKING TURNING INFORMATION

CROSS REFERENCES TO RELATED APPLICATIONS

This application claims benefit of priority to U.S. Provisional Patent Application No. 62/158,988 filed May 8, 2015 and entitled "Turning apparatus with embedded motion sensor for dancers" by Kaiser, the disclosure of which is incorporated herein by reference in its entirety.

BACKGROUND OF THE INVENTION

Field of the Invention

The present invention relates generally to aids in dancing instruction and dancing performance improvement.

Description of the Field

Mastering turns in ballet requires the practice of many elements. For example, in order to provide an aesthetic quality of a dancer facing the audience at nearly all times, and to help prevent dizziness, dancers will use a technique known as spotting. In spotting, a dancer will keep her eyes focused on one fixed point and remain focused on that point as the turn begins. Once the spot escapes from view, the dancer then accelerates the turn of her head in order to quickly return to fixing her gaze on the point. However, spotting requires practice, and proper spotting is performed in time. Whatever the speed of the turn or the number of turns, it is often desirable to have each turn be of equal duration, requiring precise control.

Further, a dancer must practice proper placement of the arms during turning. Certain turns, for example, require arms to stay in the same plane, lower than the chest level, but above waist level. In other turns, an arm position may need further adjustment which may be difficult to achieve during rotation.

Additionally, proper turning requires careful positioning of one's body. During turns there is a natural tendency to lean backwards, but in order to maintain proper form in a turn, a dancer must be careful to keep her weight forward, with the hips over the center of rotation.

Beyond these techniques, dancer's regularly work on controlling the ascent and decent for a turn. Whether a turn is on point (on the tops of one's toes) or on relevé (on raised foot but not on the top of one's toes), a dancer is often requested to use the proper amount of force in pushing off to secure the exact number of turns as needed, without providing extra energy. To achieve this, dancers must put an extreme amount of time and focus into turning practice.

Given the difficulty of turning and the number of skills needed for mastery, it is helpful to take certain elements out of the equation of turning practice. By isolating a subset of skills a dancer may focus on mastery of a subset rather than the complete set of skills. Although boards for aid in turning have been commercialized in the past, these devices do not provide feedback in the form of data to allow a dancer to understand her shortcomings and make adjustments. Other systems which provide feedback to dancers, such as U.S. Pat. No. 8,702,485 to Flury, et al., rely on complex camera systems, focus on the position of a dancer's joints for complex poses, and does not isolate the important act of turning, nor does it aid the user in practicing turning. What is needed is a device that aids dancers in turning without requiring a dancer to concentrate on each and every element of complex ballet turns and provides feedback on the quality of turns. Further, given the significant amount of practice required to master turns, a device which gamifies or adds enjoyment to the practice of turning is desired.

SUMMARY OF THE INVENTION

In accordance with one embodiment, a turning device comprises a rigid elongated member with a longitudinal curvature, a foam pad disposed upon the concave side of the rigid elongated member, and an electronics module included within the turning device, the electronics module configured to capture data related to the turning of the device.

DETAILED DESCRIPTION

Figure 1:
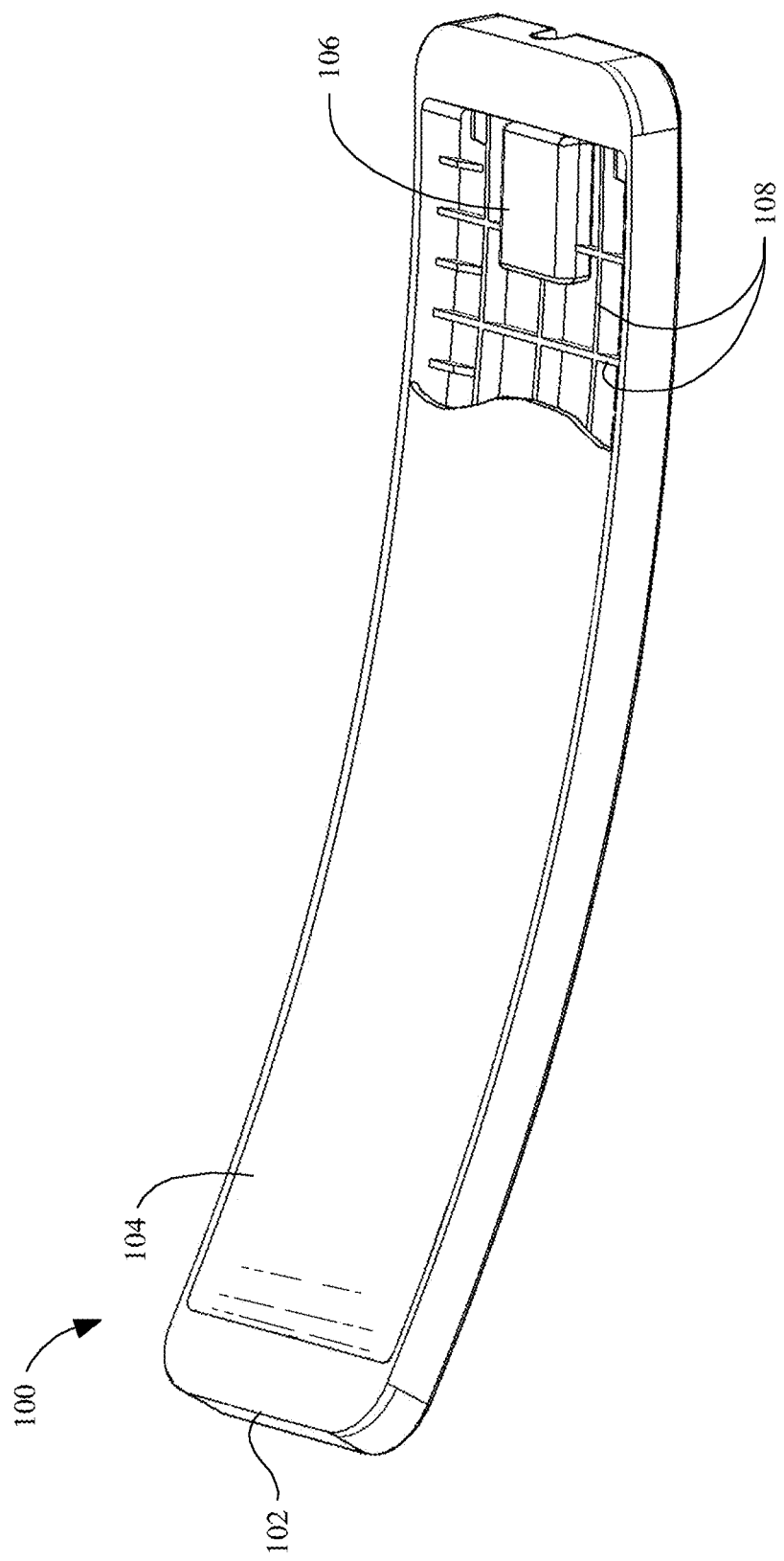
FIG. 1 illustrates a turning board with a foam cushion and electronics module.

FIG. 1 is a view of an embodiment of the present invention with enclosed electronics module. In one embodiment, board 100 is comprised of a rigid member 102, a foam member 104, and electronics module 106. Rigid member 102 is preferably comprised of glass filled nylon, high density polyethylene, or another hard plastic with similar qualities. Under ideal conditions, rigid member 102 is of a material with a low coefficient of friction to enable a user to utilize the device on wood or marley floors with minimum loss of angular momentum to frictional forces. In one embodiment, rigid member 102 has a slight curvature along its longitudinal axis. In one embodiment, the width of the arc is 11.25 inches and the height of the arc is 0.67 inches, and the radius of the curve is approximately 23.945 inches. In another embodiment, rigid member has both a longitudinal and latitudinal curvature in order to provide a small point of contact with the floor. In one embodiment the radius of the curve of the latitudinal axis is also 23.945 inches. In one embodiment, foam member 104 is comprised of ½" thick neoprene or other similar material. The use of such material allows a complete interface with a foot to the foam, and prevents the foot from slipping along the foot-foam interface.

In one embodiment, foam member 104 is attached to rigid member 102 using an adhesive such as an acrylic adhesive tape by Adchem. In another embodiment, rigid member contains a cavity along the concave surface of the board. Ridges 108 inside the cavity run along and across rigid member 102, and an adhesive may be used to attach foam member 104 to ridges 108. In one embodiment electronics module 106 is situated between foam member 104 and rigid member 102. In another embodiment, a depression is contained within the cavity at one end of the rigid member to provide a seat for the electronics module 106.

In one embodiment, electronics module 106 is a sensor containing at least an accelerometer and gyroscope, such as a MetaWear chip from Mbient Labs. Electronics module 106 takes various measurements once board 100 is detected to be spinning. In one embodiment, electronics module 106 records at least one of rotation speed, number of rotations, acceleration, pitch, and translation. Electronics module 106 may also record any combination of these elements. It should be understood that sensor types other than an accelerometer or gyroscope capable of capturing data such as rotation speed, number of rotations, acceleration, pitch, and/or translation may also be used. Recorded data is used to track the number of turns made in a turning sequence, speed of turns, change in speed of the turns, stability of the dancer, and total movement from the starting position among others. In one embodiment, raw sensor data on acceleration is captured at the module and transmitted to a computer, such as a handheld computing device. In another embodiment, data is captured by the sensor and the sensor may perform calculations on the raw data. Resulting data from the calculations may then be transmitted to a computer.

Figure 2:
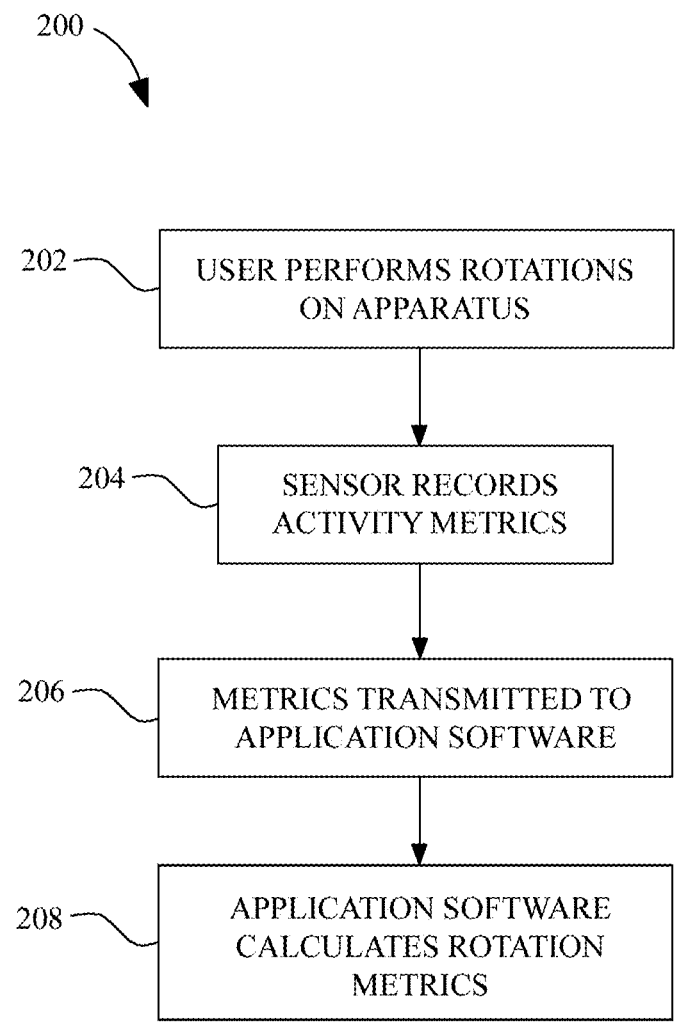
FIG. 2 illustrates a method for collecting data and calculating a performance score.

FIG. 2 illustrates a method 200 for collecting data and calculating a performance score. In one embodiment, when a user utilizes the board 100 to perform a spin at step 202 by standing on the board 100, the board 100 records data related to the turning performed. Recording of movement data occurs at step 204. In one embodiment, the board 100 automatically senses rotational movement, begins a measurement session, and records information about the rotations. In another embodiment, the module 106 is instructed to begin a measurement session and commence recording via a wired or wireless interface with a computing device. In another embodiment, a button or other switch on the board 100 is utilized to instruct the module 106 to begin a measurement session and commence recording data. In one embodiment, the electronics module 106 collects data until rotation stops, automatically ending the measurement sessions. In another embodiment, the electronics module collects data until receiving an instruction from a wired or wireless interface to stop recording data, ending the measurement session. In another embodiment, a button or other switch on the board 100 is utilized to instruct the module 106 to stop collecting data, ending the measurement session.

After collection, data may be transmitted to an application program executing on a computer at step 206. In one embodiment, data is streamed to the application program while board 100 is rotating. In another embodiment, data is sent to the application program only the electronics module 106 has detected that rotation has stopped. In another embodiment, data is not transmitted to the application program until the application program affirmatively pulls data from the electronics module 106 via a request. In another embodiment, data is transmitted to the application program after a button or other switch on the board 100 is utilized.

Figure 3:
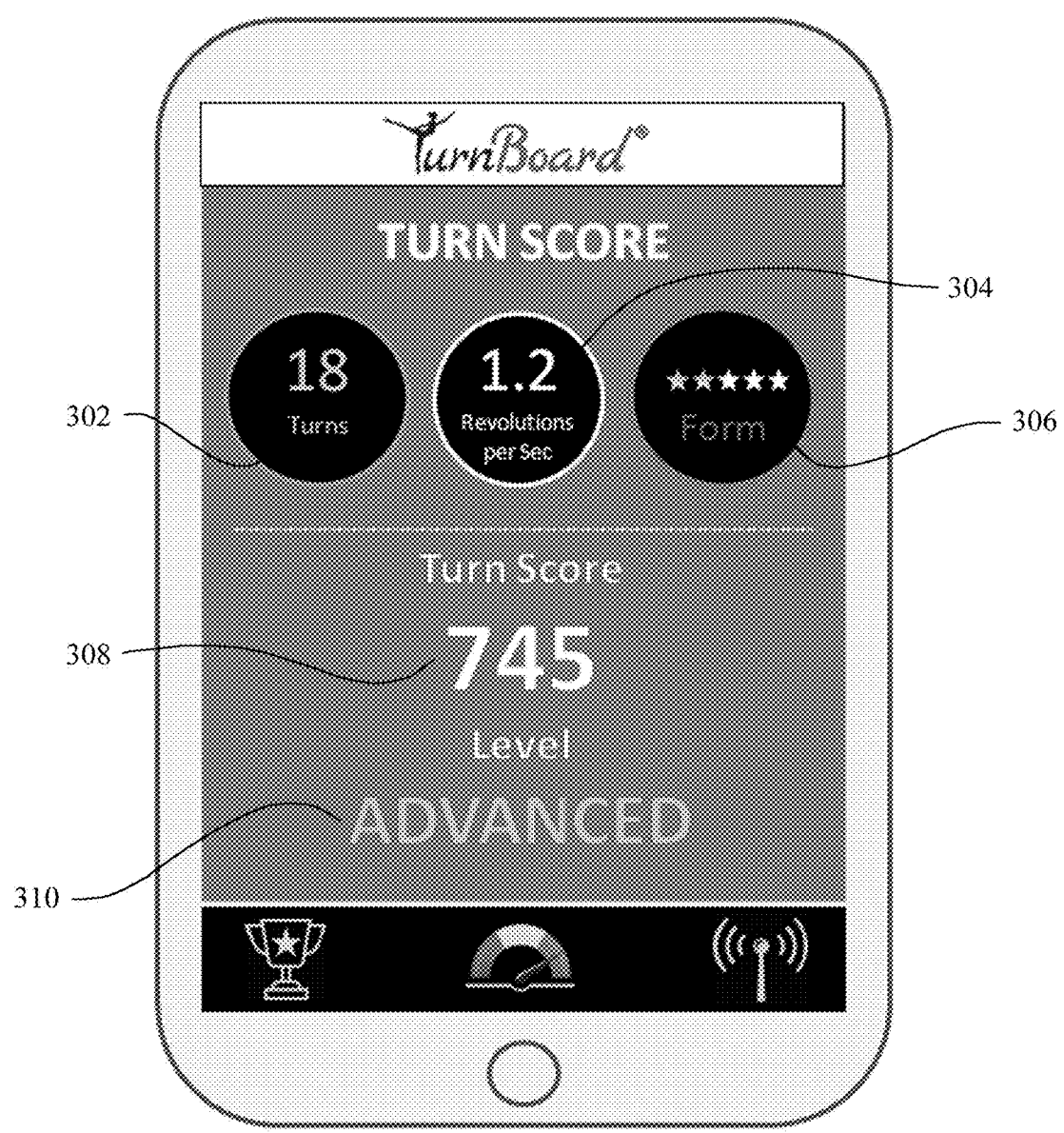
FIG. 3 illustrates an exemplary user interface for displaying a performance score.

At step 208, the transmitted data may be used to calculate an overall score regarding the quality of board rotations, which may be termed a comprehensive score. In one embodiment, the comprehensive score is based on the number of rotations, the speed of rotations, and the change in pitch of the board during the rotations. In another embodiment, the comprehensive score is based solely on the number of turns and rotation speed. It should be understood that any number of combinations of recorded data may be used in calculating the comprehensive score. Calculations need not consider each data element in the same manner, i.e., a comprehensive score may be provided by using weighted averages of data. For example, number of turns may have a larger proportional impact on the comprehensive score than turn speed or turn form. Calculations need not be performed after all rotations have stopped, but may be performed continuously while the board 100 is rotating. In one embodiment, the comprehensive score is shown to the user automatically once it is determined that turning has stopped. Cessation of turning may be determined by manual input or as a result of data feedback from the electronics module 106. In another embodiment, users of the application program may additionally add their own notes or metrics regarding the recorded turns. For example, a user may perform several turns and then record a note that the user experienced dizziness after turning. Alternatively, a user's instructor may be utilizing the application program and may note other performance issues with the user's turn, and such performance issues may be factored into the comprehensive score. The comprehensive score may be presented the user via the computing device, such as a handheld computing device or mobile telephone. The computing device may contain an application with a specially designed user interface. FIG. 3 illustrates a sample user interface for displaying the comprehensive score. The comprehensive score interface shows the number of rotations 302, revolutions per second 304, and a calculated form score 306. The comprehensive score interface also shows a total comprehensive, 308. In one embodiment, the form score is calculated based on changes in pitch on the board. In other embodiments, the form score is calculated using other metrics captured by the electronics module or metrics input manually. The comprehensive score interface may provide further interpretation of the comprehensive score, indicating that the user has achieved a level of proficiency 310 such as "INTERMEDIATE," "ADVANCED," "EXPERT," or the like. In one embodiment, the comprehensive score may be computed and transmitted to others such as friends or teachers and instructors. Users may, for example, compare themselves with their friends or use their scores to keep track of their own improvements over time.

Figure 4:
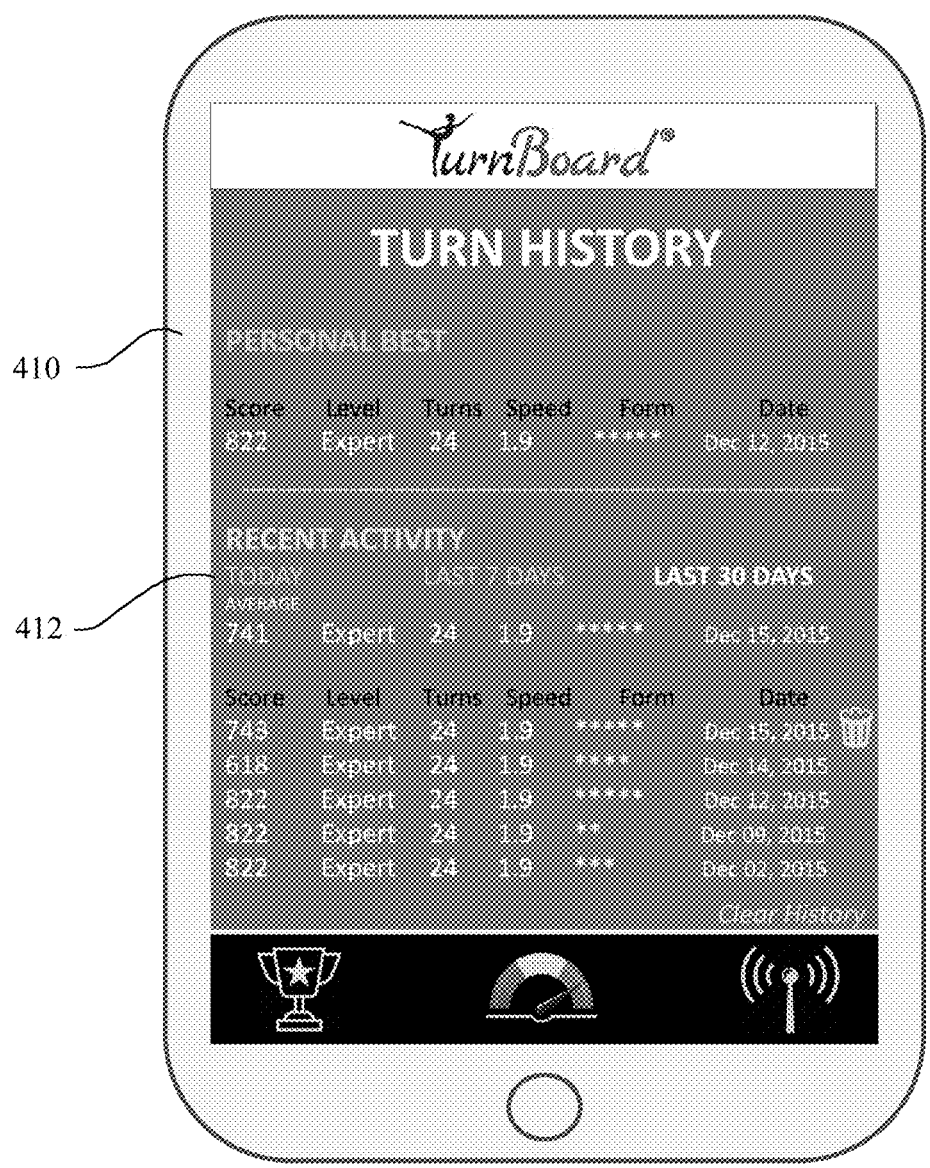
FIG. 4 illustrates another sample screen of the user interface.

FIG. 4 illustrates another sample screen of the user interface, a turn history screen. The turn history screen may display a personal best comprehensive score 410. The comprehensive score history screen may also list recent activity, detailing, for example, number of rotations, speed of rotations, form score, proficiency level, comprehensive, or date. The history screen may present a user with average comprehensive score data, including options for a variable time period such as average score in the past 24 hours, 7 days, or 30 days. Additional user interface screens may be presented in the application program, such as configuration screens, a battery monitor screen, or an FAQ screen.

The above described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A system for measuring rotation of a user comprising:
   a rigid elongated board having a fixed longitudinal curvature, forming an arc between a distal end, and a proximal end;
   said rigid elongated board further having a concave surface and a convex surface defined by said fixed longitudinal curvature;
   said rigid elongated board containing a cavity situated within said concave surface of said elongated board;
   wherein a length of the arc between said distal and said proximal end is approximately 11.25 inches;
   wherein said fixed longitudinal curvature has a radius of curvature of approximately 23.945 inches;
   a cushion, in communication with said cavity, said cushion substantially covering said concave surface;
   an electronics module, situated near said distal end of said rigid elongated board, between said cushion and the convex surface of said rigid elongated board;
   wherein said electronics module is configured to capture acceleration data, rotation data, and pitch data; and a handheld computing device;
   wherein said electronics module is configured to be connected to said handheld computing device;
   wherein said handheld computing device contains an application that is configured to:
   receive said acceleration data, rotation data, and pitch data;
   calculate a number of rotations and a speed of rotation of said rigid elongated board in a measurement session using said rotation data;
   calculate a posture score using said pitch data;
   calculate a comprehensive score based on said number of rotations, said speed of rotation, and said posture score, wherein said number of rotations has a larger proportional impact on said comprehensive score than said speed of rotation, and said number of rotations also has a larger proportional impact on said comprehensive score than said posture score; and
   display a user interface to a user, wherein said user interface is configured to display said comprehensive score and said posture score to a user, and wherein said user interface is configured to accept user-generated notes regarding said measurement session.

2. The system of claim 1, said rigid elongated board further having a fixed latitudinal curvature, wherein said fixed latitudinal curvature has a radius of curvature of approximately 23.945 inches.

3. The system of claim 2, wherein said cushion has a thickness of approximately 0.5 inches.

4. The device of claim 3, wherein said length of the arc between said distal and said proximal end is exactly 11.25 inches.

5. The device of claim 4, wherein each of said fixed latitudinal curvature and said fixed longitudinal curvature have a radius of curvature of exactly 23.945 inches.

6. The device of claim 5, wherein said measurement session ends automatically once rotation has stopped.

7. The device of claim 6, wherein said rigid elongated board is comprised of a plastic with a low coefficient of friction.

8. The device of claim 7, wherein said cushion is less than 11.25 inches long.

9. A method for measuring and analyzing rotation of a user comprising:
   providing a rigid elongated board,
   collecting data from said rigid elongated board having a fixed longitudinal curvature with an arc length of approximately 11.25 inches between a distal end and a proximal end of said fixed longitudinal curvature, a fixed latitudinal curvature, a convex surface and a concave surface defined by said longitudinal curvature, a cavity along said concave surface of said rigid elongated board, a cushion in communication with said cavity, and an electronics module situated between said cushion and said convex surface,
   transmitting said data collected from said electronics module to a computing device, and
   utilizing said data to calculate a score.

10. The method of claim 9, wherein said data collected comprises acceleration data, rotation data, and pitch data.

11. The method of claim 10, wherein said calculating comprises:
   using said rotation data to calculate a number of rotations and a speed of rotation of said rigid elongated board in a measurement session;
   using said pitch data to calculate a form score; and
   using said rotation score and said form score to calculate a comprehensive score;
   wherein said number of rotations has a larger proportional impact on said comprehensive score than said speed of rotation, and said number of rotations has a larger proportional impact on said comprehensive score than said form score.

12. The method of claim 11, the method further comprising receiving, at said computing device, user-generated notes regarding a measurement session.

13. The method of claim 12, wherein collecting data for said measurement session begins in response to a command from a user on a user interface executing on said computing device.

14. The method of claim 13, the method further comprising, detecting the end of said measurement session based on the cessation of rotation.

15. The method of claim 14, wherein said cushion is a foam cushion approximately 0.5 inches thick and less than 11.25 inches long.

16. The method of claim 15, the method further comprising, presenting, to the user at the user interface executing on said computing device, said comprehensive score, said form score, and a qualitative characterization of said score indicating a level of proficiency.

17. The method of claim 16, the method further comprising presenting, to the user at the user interface, a history of recent measurement sessions including comprehensive score data and form score data of said recent measurement sessions.

18. A system for measuring rotation of a user comprising:
   a rigid elongated board having a fixed longitudinal curvature, with a distal end and a proximal end, wherein the length of the arc between said distal end and said proximal end is approximately 11.25 inches and wherein said fixed longitudinal curvature has a radius of curvature of approximately 23.945 inches,
   said rigid elongated board further having a concave surface and a convex surface defined by said longitudinal curvature,
   said rigid elongated board containing a cavity situated within said concave surface of said elongated member,
   a cushion, in communication with said cavity, wherein said cushion is approximately 0.5 inches thick and approximately 11 inches long,
   an electronics module, situated between said cushion and the convex surface of said rigid elongated board, wherein said electronics module is configured to capture at least one of: acceleration data, rotation data, translation data, or pitch data, and a computer configured to receive and display information based on said acceleration data, rotation data, translation data, or pitch data.

19. The system of claim 18, wherein said computer is configured to calculate a form score of a measurement session based on said pitch data during said measurement session, and said computer is further configured to calculate a comprehensive score of said measurement session based on said acceleration data, said rotation data, and said form score during said measurement session.

20. The system of claim 19 wherein said computer is further configured to receive additional data from a user to annotate said form score and said comprehensive score of said measurement session.

* * * * *